United States Patent Office 2,738,348
Patented Mar. 13, 1956

2,738,348

6,7-EPOXY-3-KETOSTEROIDS

Frank B. Colton, Chicago, Ill., assignor, by mesne assignments, to G. D. Searle & Co., Skokie, Ill., a corporation of Delaware No Drawing. Application June 7, 1954,
Serial No. 435,073

6 Claims. (Cl. 260—239.55)

The present invention relates to a new group of 6,7-epoxy-3-ketosteroids and, more specifically, to compounds of the structural formula

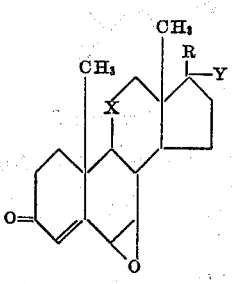

wherein X is a member of the class consisting of methylene, carbinol and carbonyl radicals, Y is a member of the class consisting of hydrogen and hydroxyl radicals, and R is a member of the class consisting of hydroxyl, acetyl, glycolyl and esterified glycolyl radicals.

As indicated in the foregoing structural formula, the compounds of my invention are 6,7-epoxy-4-androsten-3-ones which can be substituted in the 11-position by a hydroxy or an oxo radical and which contain an oxygenated function in the 17-position. The 17α-position is occupied by a radical Y which is either hydrogen or hydroxyl. The radical R, which occupies the 17β-position, can be a hydroxyl radical, an acetyl radical, a β-hydroxyacetyl radical, or a β-hydroxyacetyl radical esterified by a lower hydrocarbon carboxylic acid containing preferably 1 to 9 carbon atoms, e. g. formic, acetic, propionic, butyric, valeric, caproic, cyclopentanepropionic, cyclohexaneacetic, and benzoic acid.

The compounds of my invention have a number of valuable pharmacological activities. They are useful in the amelioration of inflammatory diseases and in the correction of abnormal electrolyte metabolism, especially where the side reactions produced by the naturally occurring hormones limit their therapeutic usefulness. They antagonize the hypertensive action of desoxycorticosterone. The 11β-hydroxy and 11-oxo derivatives of 6,7-epoxy-17,21-dihydroxy-4-pregnene-3,20-dione provide especially valuable agents in the treatment of inflammatory conditions of the eyes and arteries.

For the synthesis of the 6,7-epoxy steroids of my invention, I prefer to treat a 4,6-androstadien-3-one derivative of the structural formula

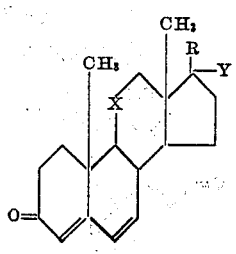

with 4 equivalents of a perbenzoic acid solution in a lower aromatic hydrocarbon such as benzene, toluene, or xylene. In some cases it is convenient to add a halogenated hydrocarbon such as 1,2-dichloroethane or chlorobenzene as a solubilizing agent. It is unnecessary to provide an external source of heat to complete the reaction. Besides the claimed 6,7-epoxy compounds, one obtains as by-products the 4,5-epoxy-6-androsten-3-one derivatives of the structural formula

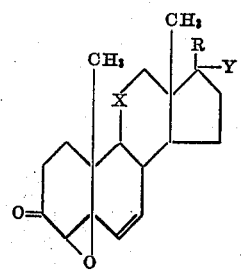

Also, with more prolonged reaction times, formation of substantial quantities of 3,4;6,7-bisepoxyandrostan-3-ones of the structural formula

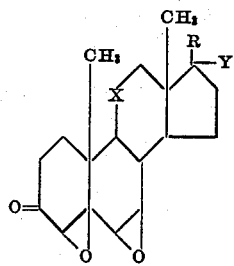

can be effected.

The following examples will describe in further detail some of the compounds which constitute this invention and methods for their synthesis. However, it will be obvious to those skilled in the art that numerous modifications in materials and methods can be adopted without departing from the invention in spirit or in scope. In these examples quantities are indicated in parts by weight.

*Example 1*

To 10 parts of 17β-hydroxy-4,6-androstadien-3-one are added 350 parts of an 0.3-N solution of perbenzoic acid in benzene. The mixture is stirred until complete solution occurs and then stored at room temperature for 27 hours. Then ether is added and the mixture is washed with dilute potassium hydroxide and saturated sodium chloride solution. The ether solution is dried over anhydrous sodium sulfate and evaporated on a steam bath with a jet of nitrogen. The residue is applied to a chromatography column containing 350 parts of silica gel in a 10% solution of ethyl acetate in benzene. The column is washed with 900 parts of benzene and then eluted with 900 parts of a 10% solution of ethyl acetate in benzene. Concentration of the eluate yields a product which, recrystallized from aqueous methanol, melts at about 105–107° C. The ultraviolet absorption spectrum of this compound shows maxima at 235 and 275 millimicrons indicating that this compound is apparently of aromatic character. The column is next washed with 1800 parts of a 15% solution of ethyl acetate in benzene. Further elution with 900 parts of a 15% solution of ethyl acetate in benzene and recrystallization of the residue from aqueous methanol yields a fraction melting at about 183–185° C. The specific rotation of a 1.37% chloroform solution is —122°. The ultraviolet absorption spectrum shows no specific absorption at 240 millimicrons but some absorption at 310 millimicrons. The infrared absorption spectrum in a potassium bromide disc shows maxima at 2.81, 5.91, 6.1, 6.86, 6.92, 7.1, 7.92, 8.12, 9.33, 9.50, 9.71, 10.78, 12.05 and 12.45 microns. The compound presumably is 4,5-epoxy-17β-hydroxy-6-androsten-3-one.

The column is next washed with 2700 parts of a 20% solution of ethyl acetate in benzene and then eluted with 2700 parts of a 25% solution of ethyl acetate in benzene. Evaporation of the eluate and recrystallization of the residue from ethyl acetate and low-boiling petroleum ether yields 6,7-epoxy-17-hydroxy - 4 - androsten - 3-one (6,7-epoxytestosterone) melting at about 207–209° C. The infrared absorption spectrum as determined in the potassium bromide disc shows maxima at 2.89, 6.02, and 6.20 microns. The ultraviolet spectrum shows a maximum at 240 millimicrons with a molecular extinction coefficient of 15,500. The specific rotation of a 1% chloroform solution is +65°. The compound has the structural formula

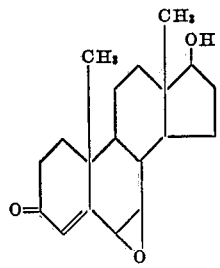

7 parts of 6,7-epoxy-17-hydroxy-4-androsten-3-one are dissolved in 400 parts of acetic acid and then treated with 33 parts of a saturated solution of hydrogen bromide in acetic acid. After standing at room temperature for 1 minute, the reaction mixture is treated with ice. The precipitate is collected on a filter, washed with water and crystallized from a mixture of ethyl acetate and low-boiling petroleum ether. There is thus obtained 6-bromo-7,17-dihydroxy-4-pregnen-3-one which melts at about 145–146° C. with decomposition. The ultraviolet absorption spectrum shows a maximum at 248 millimicrons with a molecular extinction coefficient of about 13,300. The specific rotation of an 0.54% chloroform solution is +21°.

Reaction of 4,5-epoxy-17β-hydroxy-6-androsten-3-one with hydrogen bromide and acetic acid under identical conditions yields 4,17β-dihydroxy-4,6-androstadien-3-one. The ultraviolet absorption spectrum shows a maximum at 318 millimicrons.

*Example 2*

A mixture of 12 parts of 4,6-pregnadiene-3,20-dione and 350 parts of 0.3-N perbenzoic acid in benzene is maintained at room temperature for 6 hours and then diluted with ether. The ether solution is washed with 2-N sodium hydroxide and water, dried over anhydrous sodium sulfate, filtered and evaporated under vacuum. The residue is dissolved in a 10% solution of ethyl acetate in benzene and applied onto a chromatography column containing 500 parts of silica gel. The column is washed with 900 parts of benzene and 900 parts of a 5% solution of ethyl acetate in benzene. Further elution with 900 parts of a 5% solution of ethyl acetate in benzene yields a substance which, recrystallized from aqueous methanol melts at about 104–106° C. The column is then washed with 1800 parts of a 8% solution of ethyl acetate in benzene. It is next eluted with 1800 parts of a 10% solution of ethyl acetate in benzene. On concentration and crystallization from aqueous methanol there is obtained 4,5-epoxy-6-pregnene-3,20-dione melting at about 141–143° C. The infrared spectrum shows maxima at 5.83, 5.89, 6.88, 7.21, 7.39, 7.92, 8.09, 10.72, 11.27 and 11.99 microns.

The column is next washed with 900 parts of a 10% solution of ethyl acetate and 1800 parts of a 15% solution of ethyl acetate in benzene. Further elution with 4500 parts of a 15% solution of ethyl acetate in benzene yields 6,7-epoxy-4-pregnene-3,20-dione which, recrystallized from aqueous methanol, melts at about 175–177° C. The ultraviolet absorption spectrum of a methanolic solution shows a maximum at 240 millimicrons with a molecular extinction coefficient of 15,300. The optical rotation of a 1% chloroform solution is $\alpha_D^{25}=+71°$. The compound has the structural formula

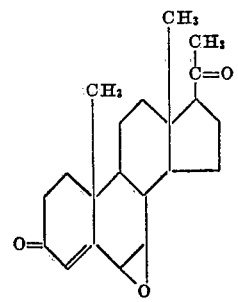

*Example 3*

A mixture of 5.8 parts of 17-hydroxy-21-acetoxy-4,6-pregnadiene-3,11,20-trione and 261 parts of an 0.36-N perbenzoic acid solution in benzene is shaken periodically at room temperature for an hour and then stirred with 126 parts of 1,2-dichloroethane for 3 hours. 2500 parts of ethyl acetate are added and the reaction mixture is washed with 1-N aqueous sodium hydroxide solution and then with saturated sodium chloride solution. After evaporation to dryness under vacuum, the crystalline residue is dissolved in a 10% solution of ethyl acetate in benzene and applied to a chromatography column containing 350 parts of silica gel. The column is washed with 3500 parts of a 10% solution of ethyl acetate in benzene and then eluted with 5200 parts of a 15% solution of ethyl acetate in benzene. Upon crystallization of the residue obtained from this eluate from aqueous methanol a product is obtained melting at about 229–231° C. with decomposition. This material shows no specific absorption in the ultraviolet region between 220–285 millimicrons. It is apparently the 4,5-epoxy-17-hydroxy-21-acetoxy-6-pregnene-3,11,20-trione. The column is next washed with 1600 parts of an 18% solution of ethyl acetate in benzene. Subsequent elution with a solution of 20% ethyl acetate in benzene and evaporation of the eluate yields 6,7 - epoxy - 17 - hydroxy - 21 - acetoxy - 4 - pregnene - 3,11,20-trione which, recrystallized from aqueous methanol, melts at about 260–262° C. with decomposition. The ultraviolet absorption spectrum of a 1% methanolic solution shows a maximum at 239 millimicrons with a molecular extinction coefficient of 15,000.

A 95% methanol solution of this product is shaken with one equivalent of a 0.1-N solution of sodium hydroxide at room temperature. Neutralization, and concentration under vacuum yields the 6,7-epoxy-17,21-dihydroxypregnene-3,11,20-trione of the structural formula

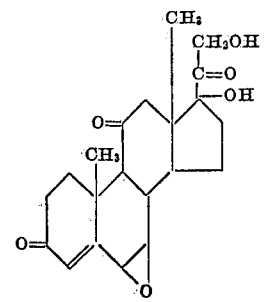

Treatment of 6,7-epoxy-17-hydroxy-21-acetoxy-4-pregnene-3,11,20-trione with hydrogen bromide in acetic acid according to the method of Example 1 yields 6-bromo-7,17-dihydroxy-21-acetoxy-4-pregnene-3,11,20-trione, which recrystallized from a mixture of ethyl acetate and cyclohexane, melts at about 215° C. with decomposition.

*Example 4*

A mixture of 4 parts of 17-hydroxycorticosterone acetate, 1430 parts of chlorobenzene and 1600 parts of carbon tetrachloride is boiled to expel all moisture and then treated in a nitrogen atmosphere with 1 part of pyridine and 0.5 parts of N-bromosuccinimide. The reaction mixture is refluxed for 3 minutes while exposed to a bright source of light and then cooled, washed with water, dried over anhydrous calcium sulfate, filtered and evaporated under vacuum. A saturated chloroform solution of 4.32 parts of the crude 6-bromo-17-hydroxycorticosterone acetate thus obtained is added to a solution of 1.25 parts of salicyclic acid, 1.35 parts of semicarbazide and 600 parts of tertiary butanol. The mixture is permitted to stand at room temperature in a nitrogen atmosphere for 2 days and is then concentrated to one-third of its original volume, diluted with water, and extracted with chloroform. The extract is washed with sodium bicarbonate and water, dried over anhydrous calcium sulfate, filtered and evaporated under vacuum. The residual semicarbazone of 11β,17-dihydroxy-21-acetoxy-4,6-pregnadiene-3,20-dione is crystallized from 95% ethanol. 2 parts of this semicarbazone and 8 parts of p-hydroxybenzaldehyde are dissolved in 780 parts of 80% acetic acid and heated under a nitrogen atmosphere for 48 hours at 45° C. The reaction mixture is concentrated under vacuum and then extracted with chloroform. The extract is washed successively with sodium bicarbonate, dilute acetic acid and water, dried over anhydrous calcium sulfate, and evaporated under vacuum. The residue is dissolved in a 10% solution of ethyl acetate in benzene and thus applied to a silica gel chromatography column. The column is washed with benzene and solutions of ethyl acetate in benzene containing increasing amounts of ethyl acetate. A solution of 15% ethyl acetate in benzene elutes 11β,17-dihydroxy-21-acetoxy-4,6-pregnadiene-3,20-dione which, recrystallized from a mixture of acetone and ether, melts at about 223-226° C. with decomposition. The ultraviolet absorption spectrum shows a maximum at about 281 millimicrons with a molecular extinction coefficient of 25,800.

A mixture of 6 parts of 11β,17-dihydroxy-21-acetoxy-4,6-pregnadiene-3,20-dione and 325 parts of an 0.3-N perbenzoic acid solution in benzene is shaken periodically at room temperature for 45 minutes and then stirred with 130 parts of 1,2-dichloroethane for 5 hours. The reaction mixture is diluted with ether, and the ether solution is washed with 1-N aqueous sodium hydroxide solution and then with saturated sodium chloride solution, dried over anhydrous calcium sulfate, filtered and evaporated under vacuum. The residue is taken up in a 10% solution of ethyl acetate in benzene and thus applied to a chromatography column containing silica gel. The column is washed with benzene solutions containing increasing amounts of ethyl acetate. A 20% solution of ethyl acetate in benzene elutes a compound which has been tentatively identified as 4,5-epoxy-11β,17-dihydroxy-21-acetoxy-6-pregnene-3,20-dione. Subsequent elution with a solution of 25% ethyl acetate in benzene and evaporation of the eluate yields the 6,7-epoxy-11β,17-dihydroxy-21-acetoxy-4-pregnene-3,20-dione which is recrystallized from aqueous methanol. The ultraviolet absorption spectrum of a methanolic solution shows a maximum at 240 millimicrons with a molecular extinction coefficient of 15,500. Deacetylation under mild conditions as in the preceding example yields the 6,7-epoxy-11β,17,21-trihydroxypregnene-3,20-dione of the structural formula

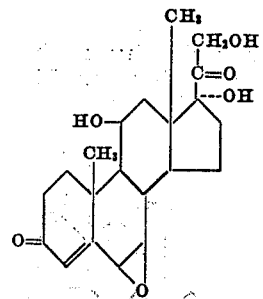

*Example 5*

A mixture of 27 parts of 21-acetoxy-4,6-pregnadien-3,20-dione and 1230 parts of an 0.4-N perbenzoic acid solution in benzene is stirred for 5 hours at room temperature and then diluted with 10,000 parts of ethyl acetate. After successive washing with 1-N aqueous sodium hydroxide solution and saturated sodium chloride solution, the reaction mixture is taken to dryness under vacuum and the residue is dissolved in a 5% solution of ethyl acetate in benzene and thus applied to a silica gel chromatography column. The column is eluted as in the foregoing example. After elution of a presumably aromatic material, 4,5-epoxy-21-acetoxy-6-pregnene-3,20-dione is eluted with a 15% solution of ethyl acetate in benzene. The ultraviolet absorption spectrum of this compound shows no specific absorption at 240 millimicrons. Further elution with a solution of 15% ethyl acetate in benzene, evaporation of the eluate and crystallization of the residue from a mixture of ethyl acetate and benzene yields 6,7-epoxy-21-acetoxy-4-pregnene-3,20-dione which melts at about 161° C. The ultraviolet absorption spectrum of a methanolic solution shows a maximum at about 240 millimicrons and an extinction coefficient of 15,000. 1 part of this product is dissolved in 40 parts of 95% methanol and then treated in the course of 15 minutes with one equivalent of an 0.1-N solution of sodium hydroxide with shaking. The reaction mixture is cautiously neutralized and then concentrated to yield 6,7-epoxy-21-hydroxy-4-pregnene-3,20-dione which has the structural formula

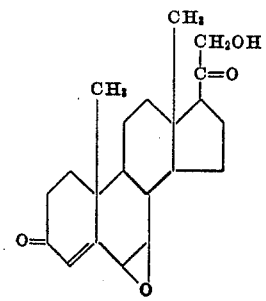

Infrared maxima are observed at 2.9, 5.9, and 6.0 microns. Treatment of 6,7-epoxy-21-acetoxy-4-pregnene-3,20-dione in acetic acid with hydrogen bromide in acetic acid for 1 minute by the procedure of Example 1 yields 6 - bromo - 7 - hydroxy - 21 - acetoxy - 4 - pregnene-3,20-dione which, on recrystallization from a mixture of acetone and petroleum ether, melts at about 189-190° C. with decomposition.

*Example 6*

A mixture of 41 parts of 6,7-epoxy-21-acetoxy-4-pregnene-3,20-dione, 34 parts of powdered sodium cyanide, 243 parts of p-toluenesulfonic acid monohydrate and 2000 parts of glacial acetic acid is shaken for 8 minutes at room temperature, then diluted with water and chilled. A gel separates which is recrystallized from a mixture of low-boiling petroleum ether and acetone.

The 6-cyano-7-hydroxy-21-acetoxy-5-pregnene-3,20-dione thus obtained melts at about 138–140° C. with decomposition.

I claim:

1. A member of the class consisting of 6,7-epoxytestosterone; 6-7-epoxy-4-pregnene-3,20-dione and compounds of the structural formula

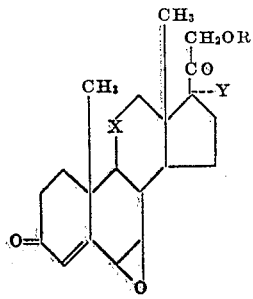

wherein R is a member of the class consisting of hydrogen and (lower alkyl)—CO—radicals; Y is a member of the class consisting of hydrogen and hydroxyl radicals; and X is a member of the class consisting of methylene and, only in the case wherein Y is a hydroxyl radical, hydroxymethylene and carbonyl radicals.

2. 6,7-epoxytestosterone.
3. 6,7-epoxy-4-pregnene-3,20-dione.
4. 6,7-epoxy-21-hydroxy-4-pregnene-3,20-dione.
5. 6,7 - epoxy - 17,21 - dihydroxy - 4 - pregnene-3,11,20-trione.
6. 6,7 - epoxy - 11β,17α,21 - trihydroxy - 4 - pregnen-3,20-dione.

No references cited.